United States Patent [19]
Ibrahim

[11] Patent Number: 5,959,792
[45] Date of Patent: Sep. 28, 1999

[54] POWERED MIRROR APPARATUS

[76] Inventor: Abdalla M. Ibrahim, P.O. Box 1011, Seeley, Calif. 92273

[21] Appl. No.: 09/174,810

[22] Filed: Oct. 19, 1998

Related U.S. Application Data

[60] Provisional application No. 60/064,767, Nov. 10, 1997.

[51] Int. Cl.$^6$ ............................ G02B 7/182; F21V 33/00
[52] U.S. Cl. ........................ 359/872; 359/876; 359/877; 359/882; 362/139; 362/142; 248/485; 248/487
[58] Field of Search ..................... 359/367, 872, 359/877, 881, 882, 873, 876, 604, 874; 248/479, 481, 485, 486, 487; 362/135, 138, 139, 140, 141, 142

[56] References Cited

U.S. PATENT DOCUMENTS

| | | | |
|---|---|---|---|
| 998,021 | 7/1911 | Marcy | 359/882 |
| 1,036,000 | 8/1912 | Pease | 359/882 |
| 1,859,682 | 5/1932 | Ranstead | 362/139 |
| 2,581,304 | 1/1952 | Sims . | |
| 2,852,979 | 9/1958 | Hund . | |
| 2,948,912 | 8/1960 | Wisdom | 359/508 |
| 3,003,397 | 10/1961 | Jacobus . | |
| 3,004,474 | 10/1961 | Hund . | |
| 3,492,065 | 1/1970 | Kurz, Jr. . | |
| 3,859,987 | 1/1975 | Holstad . | |
| 4,039,818 | 8/1977 | Hickman | 359/874 |
| 4,050,776 | 9/1977 | Hsu . | |
| 5,428,484 | 6/1995 | Baker | 362/139 |

FOREIGN PATENT DOCUMENTS

| | | |
|---|---|---|
| 897990 | 6/1962 | United Kingdom . |
| 2044946 | 10/1980 | United Kingdom . |

*Primary Examiner*—Ricky D. Shafer
*Attorney, Agent, or Firm*—Douglas E. White

[57] ABSTRACT

An ergonomic vehicle inspection mirror apparatus has a handle, a pole or casing, and a foot. Mounted on the foot is a rotatable mirror. The mirror is attached to the foot by means of a pivot shaft, about which the mirror is capable of two degrees of rotational freedom, in order to turn the plane of the mirror at various angles with respect to the foot. Rotation about the pivot shaft is actuated by an electric motor in the foot. The motor is interconnected with a toggle switch in the handle. Pushing the switch in a particular direction causes the mirror to rotate in that direction. The inspector can place the foot of the device under the vehicle with the pole at an attitude that is chosen to be comfortable. Thereafter, the mirror may be rotated with the switch so as to direct the line of sight at various points under the vehicle body without having to readjust the pole for each angle of view.

14 Claims, 3 Drawing Sheets

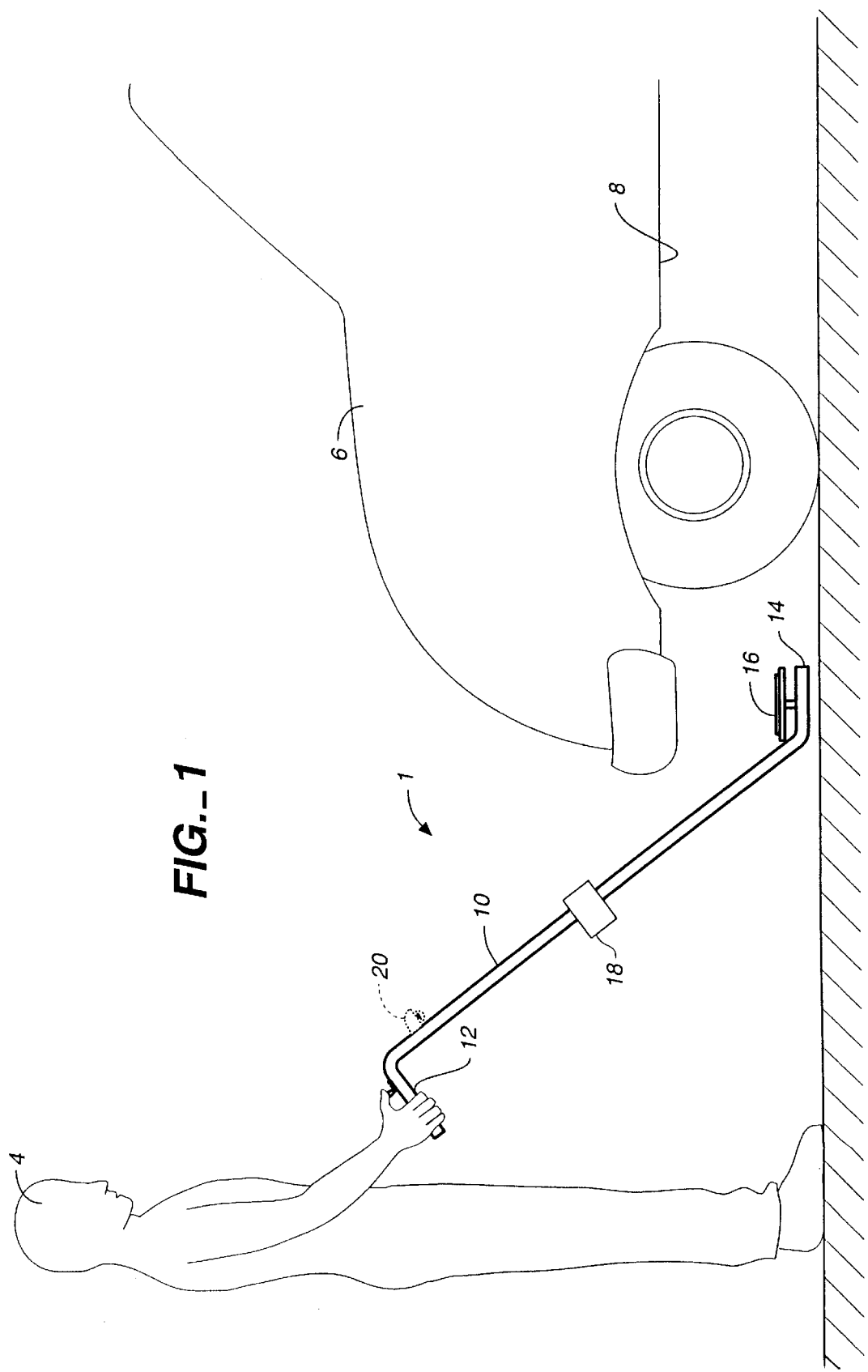

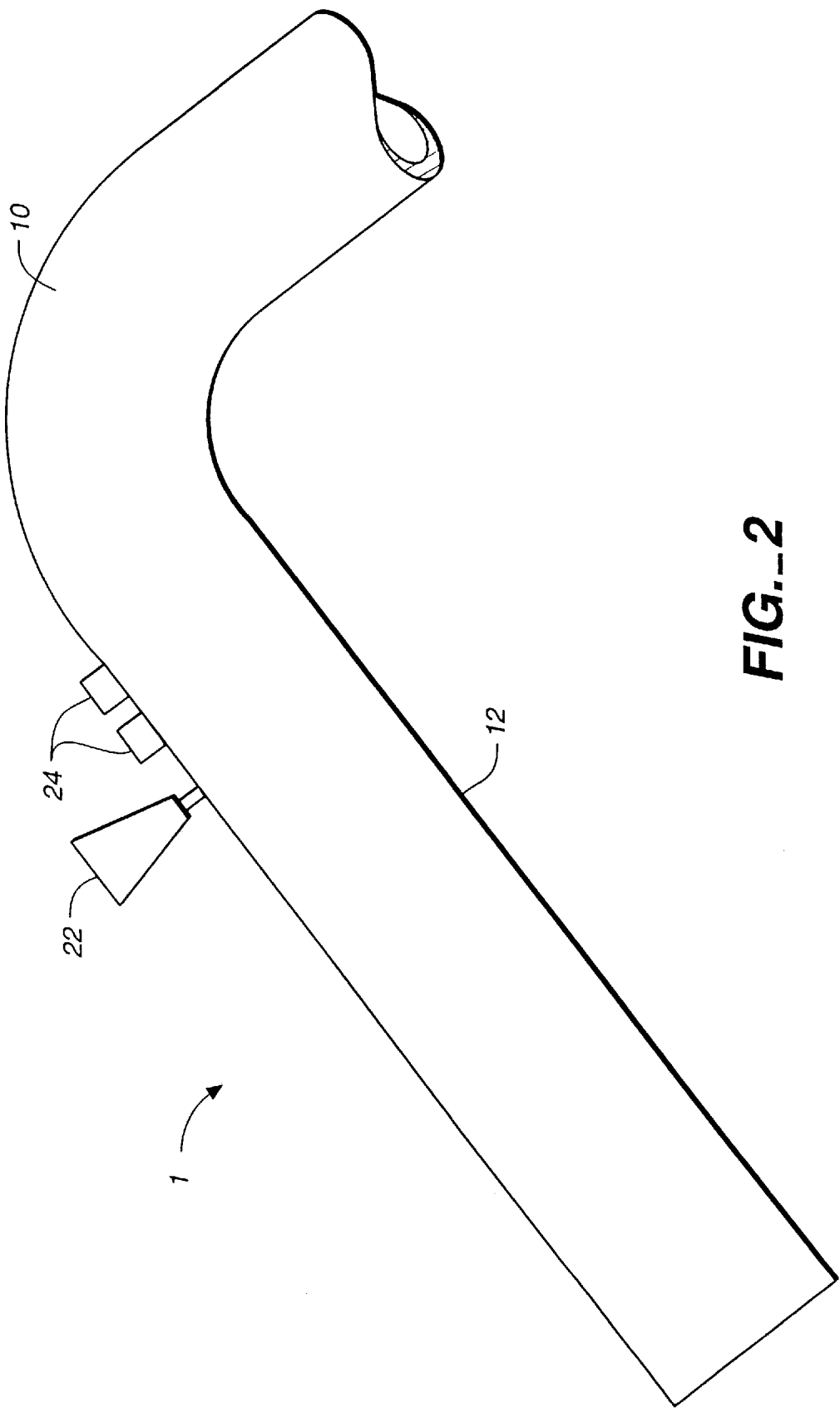
FIG._2

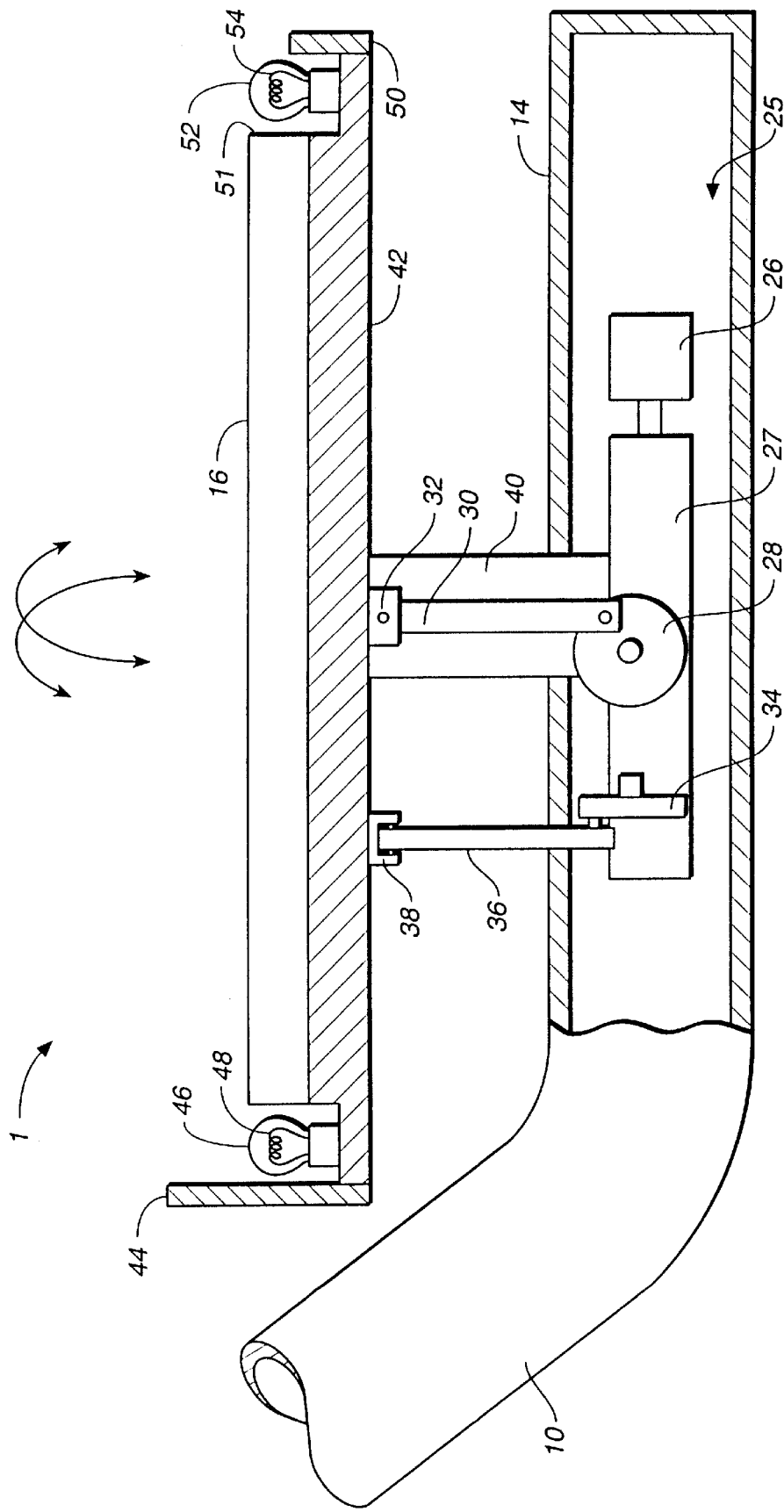
FIG._3

POWERED MIRROR APPARATUS

CROSS REFERENCE TO RELATED APPLICATIONS

This application claims the benefit of U.S. Provisional Application No. 60/064,767, filed Nov. 10, 1997.

FEDERALLY SPONSORED RESEARCH OR DEVELOPMENT

Not applicable.

FIELD OF THE INVENTION

This invention relates to inspection mirrors, more particularly to a pole-type vehicle inspection apparatus having a motorized mirror capable of universal rotation about two coplanar axes.

BACKGROUND OF THE INVENTION

Inspections of the underside of vehicles for hidden narcotics, explosives and other contraband often is done, in the first instance, with the assistance of a mirror that is mounted on the end of a pole. The inspector uses the pole to place the mirror under the vehicle. By twisting and turning the pole with one hand and manipulating a flashlight with the other, he obtains a direct line-of-sight reflected view of most of the underside of the vehicle. However, the pole must be twisted and cocked at a wide variety of angles to accomplish this, forcing the inspector to bend and turn and to twist his or her arm at a variety of uncomfortable and tiring angles. Particularly at border-crossing customs points, many vehicles must be inspected hourly in this manner. The result is fatigue to the worker—causing inefficiency and perhaps eventually even stress-related injury.

Prior developments in this field may be generally illustrated by reference to the following information disclosure statement:

| U.S. Pat. No. | Patentee | Issue Date |
|---|---|---|
| U.S. Patent Documents | | |
| 2,581,304 | R. Sims | Jan. 1, 1952 |
| 3,004,474 | F. Hund | Oct. 17, 1961 |
| 3,003,397 | L. Jacobus | Oct. 10, 1961 |
| 2,852,979 | F. Hund | Sept. 23, 1958 |
| 4,050,776 | M. Hsu | Sept. 27, 1977 |
| 3,492,065 | A. Kurz, Jr. | Jan. 27, 1970 |
| Document No. | Country | Publication Date |
| Foreign Patent Documents | | |
| GB2,044,946 | Great Britain | Oct. 22, 1980 |
| GB897,990 | Great Britain | Jun. 6, 1962 |

Patent GB2,044,946 teaches an illuminated mirror inspection device that has battery-powered lights on the handle, and has a manually-operated mechanical lever with which to rotate the mirror about axes extending at right angles to one another. Even in a pole mirror affording one or more degrees of remote-controlled rotational freedom to the mirror, the manual operation thereof (requiring repeated significant pressure of the thumb or finger) can be a source of strain and fatigue to the hand.

Patents GB897,990, 3,004,474, 3,003,397 and 2,852,979 teach inspection mirrors on elongated handles that can be manipulated to allow mirror movement, all of which are manual.

U.S. Pat. Nos. 4,050,776 and 3,492,065 show electrically powered movement of the side rear-view mirrors of vehicles.

It therefore will be appreciated that there continues to be a need for a new and improved powered mirror apparatus which addresses the problems of construction, effectiveness and ease of use that are attendant in the prior art. In this respect, the present invention substantially fulfills this need.

SUMMARY OF THE INVENTION

In view of the disadvantages inherent in the known art, the general purpose of the present invention, which will be described subsequently in greater detail, is to teach a new and improved powered mirror apparatus which has all of the important advantages of the prior art and few, if any, of the disadvantages.

The present invention is an ergonomic vehicle inspection mirror apparatus having a gripping handle, a tubular pole or casing, and a foot. Mounted on the foot is a rotatable mirror. The mirror is attached to the foot by means of a pivot shaft, about which the mirror is capable of two degrees of rotational freedom in order to turn the plane of the mirror at various angles with respect to the foot. The pivot action is controlled by a motor in the foot. Wiring leads up the pole to a source of power, such as a battery pack and/or an AC/DC converter. The wiring is further interconnected to a universal-rotation toggle switch in the handle. Pushing the switch lightly in a particular direction causes the mirror to rotate in that direction, much in the way powered automobile rear-view side mirrors are operated.

The inspector can place the foot of the device under the vehicle with the pole at an attitude that is chosen to be comfortable. Thereafter, the mirror may be rotated with the toggle switch so as to direct his or her line of sight at various points under the vehicle body without having to readjust the pole for each angle of view. Of course, the foot still will need to be moved around under the vehicle, but the range of angular motion required for the pole will be so greatly constrained as to significantly reduce or eliminate the fatigue customarily associated with the use of prior art pole-type mirror inspection equipment-even that having manually-operated mirror rotation means.

While the device may be operated with one hand, freeing the other for use of a flashlight, the device also may incorporate a variety of high intensity illumination means, either on the pole, at the foot, or on the periphery (or even the center) of the mirror itself.

FEATURES AND ADVANTAGES

It is therefore an object of the present invention to provide a new and improved powered mirror apparatus which has all, or nearly all, of the advantages of the prior art, while simultaneously overcoming most of the disadvantages normally associated therewith.

It is another object of the present invention to provide a new and improved powered mirror apparatus which may be easily and efficiently manufactured and marketed.

A further object or feature of the present invention is a new and improved powered mirror apparatus which is of a durable and reliable construction.

An even further object of the present invention is to provide a novel powered mirror apparatus which is susceptible of a low cost of manufacture with regard to both materials and labor, and which accordingly is then susceptible of low prices of sale to the public, thereby making the powered mirror apparatus economically available to consumers.

Still another object of the present invention is to provide a novel powered mirror apparatus wherein an increased ease of assembly is permitted relative to the art.

Another object or feature is a new and improved powered mirror apparatus that is easy to use, attractive in appearance and suitable for mass production.

An object of this invention is to disclose an inspection mirror which is powered electrically to eliminate the need for tiresome manual manipulation of the angle the mirror makes with the line of sight of a user.

Accordingly, a feature of the invention disclosed herein is a powered mirror apparatus, including: a pole having proximal and distal ends; a handle on the proximal end of the pole; a foot on the distal end of the pole; a mirror rotatably attached to the foot, the mirror having a peripheral edge; and electrically powered rotation means for enabling the mirror to rotate about two coplanar axes of rotation in a universal manner.

Another feature is the apparatus may further include a portable power source on the handle.

As a preferred feature, the electrically powered rotation means includes a pivoting toggle switch on the handle.

Another feature is the electrically powered rotation means may include a D.C. motor; a gear box operably connected to the motor; a pair of connecting rods rotatably connected to the mirror; and a pair of transmission disks, each disk rotatably connected to one of the connecting rods and operably connected to the gear box.

As a preferred feature, the device further includes at least one electric light affixed to the apparatus and connected to the power source.

Yet another feature is a base onto which the mirror is affixed and wherein the at least one electric light is attached to the base in fixed position relative to the mirror, whereby the at least one electric light rotates with the mirror.

Yet another feature is a proximal frame wall having a top and attached to the base in fixed position relative to the peripheral edge of the mirror and proximal to the pole and wherein the at least one electric light is a proximal electric light having a proximal light element, the proximal electric light sandwiched between the peripheral edge of the mirror and the proximal frame wall, the top of the proximal frame wall projecting upward above the proximal light element.

Still another feature is a distal electric light distal to the peripheral edge and the pole, the distal electric light having a distal light element, the peripheral edge of the mirror projecting upward above the distal light element.

Other novel features which are characteristic of the invention, as to organization and method of operation, together with further objects and advantages thereof will be better understood from the following description considered in connection with the accompanying drawing, in which preferred embodiments of the invention are illustrated by way of example. It is to be expressly understood, however, that the drawing is for illustration and description only and is not intended as a definition of the limits of the invention. The various features of novelty which characterize the invention are pointed out with particularity in the claims annexed to and forming part of this disclosure. The invention resides not in any one of these features taken alone, but rather in the particular combination of all of its structures for the functions specified.

There has thus been broadly outlined the more important features of the invention in order that the detailed description thereof that follows may be better understood, and in order that the present contribution to the art may be better appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of this application, which is measured by the claims, nor is it intended to be limiting as to the scope of the invention in any way.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

BRIEF DESCRIPTION OF THE DRAWING

The invention will be better understood and objects other than those set forth above will become apparent when consideration is given to the following detailed description thereof. Such description makes reference to the annexed drawing wherein:

FIG. 1 is a front elevation of a preferred embodiment of the powered mirror apparatus of this invention;

FIG. 2 is an enlarged front elevation, in broken section, of the handle of the apparatus of FIG. 1; and FIG. 3 is an enlarged schematic front elevation, in broken section, of the foot of the apparatus of FIG. 1.

DRAWING REFERENCE NUMERALS 1 powered mirror apparatus
4 user
6 vehicle
8 underside
10 pole
12 handle
14 foot
16 mirror
18 power source
20 light
22 toggle switch
24 light switch
25 powered rotation means
26 motor
27 gearbox
28 transmission disk 30 connecting rod
32 bracket
34 transmission disk
36 connecting rod
38 bracket
40 pivot shaft
42 base
44 proximal frame wall
46 proximal light bulb
48 element
50 distal frame wall
51 peripheral edge
52 distal light bulb
54 element

DETAILED DESCRIPTION OF THE INVENTION

Referring to FIG. 1, there is illustrated therein a preferred powered mirror apparatus 1 of this invention. The powered mirror apparatus 1 enables a user 4 to inspect the underside 8 of a vehicle 6 for drugs, explosives and like contraband.

The powered mirror apparatus 1 is generally comprised of a pole 10 having on its proximal end a handle 12 and having on its distal end a foot 14 bearing an inspection mirror 16. A battery pack, AC/DC converter, or other suitable portable source of electric power 18 is mounted in or on the pole 10 at a convenient location. Optionally, the pole 10 may have a light 20 mounted on its proximal end (i.e., the end nearest the user 4 and the handle 12). Preferably, however, one or more light bulbs will be located at the foot 14, on or near the mirror 16.

Turning briefly to FIG. 2, it can be seen that the handle 12 has a group of controls mounted thereon within convenient access of the fingers of the user 4. A pivoting toggle switch 22 of conventional design is used to control pivoting of the mirror 16 in one-to-one correspondence therewith, as discussed below. One or more light switches 24 operate strategically placed light bulbs (FIGS. 1 and 3).

FIG. 3 illustrates the electrically powered rotation means 25 that enables the mirror 16 to rotate about two coplanar axes of rotation in a universal manner. An electric motor 26 in the foot 14 preferably is connected to the mirror 16 by means of a gear box 27 that operates a pair of connecting rods 30, 36. These rods pull and push the mirror 16 in rotation about a fixed pivot shaft 40. The electric motor 26 preferably is of the two directional D.C. type.

The gear box 27 is of a type which is in widespread use for achieving similar attitude control of remote side rearview mirrors in automobiles. For example, a preferred gear box is described in U.S. Pat. No. 4,050,776 to Hsu, the disclosure of which is incorporated by reference herein. The gear box 27 selectively turns transmission disks 28, 34, according to coordinated movement of the toggle switch 22. In turn, the first transmission disk 28 translates the connecting rod 30, which rod is connected to the base 42 of the mirror 16 by means of a bracket 32 that is offset a set distance from the pivot shaft 40, along a first axis passing through the top of the pivot shaft (the first axis projecting perpendicular from the plane of the drawing).

The second transmission disk 34 pushes and pulls the connecting rod 36, which rod is connected to bracket 38. The bracket 38 is offset from the pivot shaft 40 along a second axis passing through the top of the pivot shaft at a right angle and coplanar with the first axis (the second axis lying within the plane of the drawing). Insofar as the plane of the coplanar first and second axes is parallel to the plane of the mirror 16, the combination of movements of connecting rods 30, 36 allows the mirror 16 to rotate in a universal manner about the two coplanar axes, providing a user 4 with a wide range of alternate views of the underside 8 of a vehicle 6. The connecting rod 36 causes the mirror 16 to rotate about the first axis and the connecting rod 30 causes the mirror 16 to rotate about the second axis.

Preferably, one or more lights are provided in close proximity to the mirror 16 for illuminating the object or area being observed. Such lights may have their beams focused directly at the object, or they may be oriented so that the beams of light first reflect off of the mirror.

One such light comprises the proximal light bulb 46, which may be sandwviched between the peripheral edge 51 of the mirror 16 and a proximal frame wall 44 (i.e., the wall nearest to the user 4 and the pole 10). Preferably, the top of the proximal frame wall 44 projects upward above the level of the light's filament or element 48 so that the light beam is normally not directed back into the eyes of the user 4. A second light may comprise distal light bulb 52, which may be sandwiched between the peripheral edge 51 of the mirror 16 and a distal frame wall 50 (i.e., the wall furthest away from the user 4 and the pole 10). Preferably, the peripheral edge 51 of the mirror projects upward above the level of the light element 54 so that the light beam is normally not directed back into the eyes of the user 4, whereas the distal frame wall 50 is lower than the element 54 to allow the light beam to project ahead and illuminate the viewed object or area.

As to the manner of usage and operation of the instant invention, the same should be apparent from the above disclosure, and accordingly no further discussion relative to the manner of usage and operation of the instant invention need be provided.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, various modifications, alternative construetions, and equivalents may be employed without departing from the true spirit and scope of the invention. Such changes might involve alternative materials, components, structural arrangements, sizes, operational features or the like.

For example, other electric motor and gear box means in common use would be suitable for providing the electrically powered rotation means 25 of this invention. The device need not be provided with electric lights—for applications wherein the use of a handheld flashlight is preferred.

Therefore, the above description and illustrations should not be construed as limiting the scope of the invention, which is defined by the appended claims.

I claim:

1. A powered mirror apparatus, including:
    a pole having proximal and distal ends;
    a handle on the proximal end of the pole;
    a foot on the distal end of the pole;
    a mirror rotatably attached to the foot, the mirror having a peripheral edge; and
    electrically powered rotation means for enabling the mirror to rotate about two coplanar axes of rotation in an universal manner.

2. The apparatus of claim 1 further including:

a portable power source on the handle.

3. The apparatus of claim 2 wherein:

the electrically powered rotation means includes
  a pivoting toggle switch on the handle.

4. The apparatus of claim 3 wherein:

the electrically powered rotation means includes
  a D.C. motor;
  a gear box operably connected to the motor;
  a pair of connecting rods rotatably connected to the mirror; and
  a pair of transmission disks, each disk rotatably connected to one of the connecting rods and operably connected to the gear box.

5. The apparatus of claim 3 further including:

at least one electric light affixed to the apparatus and connected to the power source.

6. The apparatus of claim 5 further including:

a base onto which the mirror is affixed and wherein
  the at least one electric light is attached to the base in a fixed position relative to the mirror, whereby the at least one electric light rotates with the mirror.

7. The apparatus of claim 6 further including:

a proximal frame wall having a top and attached to the base in a fixed position relative to the peripheral edge of the mirror and proximal to the pole and wherein
  the at least one electric light is a proximal electric light having a proximal light element, the proximal electric light sandwiched between the peripheral edge of the mirror and the proximal frame wall, the top of the proximal frame wall projecting upward above the proximal light element.

8. The apparatus of claim 7 further including:

a distal electric light distal to the peripheral edge and the pole, the distal electric light having a distal light element, the peripheral edge of the mirror projecting upward above the distal light element.

9. In a powered mirror apparatus having a rotatable mirror with a peripheral edge and having electrically powered rotation means for enabling the mirror to rotate about two coplanar axes of rotation in an universal manner, the improvement comprising:

a pole having proximal and distal ends;
  a handle on the proximal end of the pole;
  a foot on the distal end of the pole, the mirror rotatably attached to the foot; and
  a portable power source on the handle.

10. The apparatus of claim 9 further including:

a pivoting toggle switch on the handle operably connected to the electrically powered rotation means.

11. The apparatus of claim 10 further including:

at least one electric light.

12. The apparatus of claim 11 further including:

a base onto which the mirror is affixed and wherein
  the at least one electric light is attached to the base in a fixed position relative to the mirror, whereby the at least one electric light rotates with the mirror.

13. The apparatus of claim 12 wherein:

the at least one electric light is a distal electric light distal to the peripheral edge and the pole, the distal electric light having a distal light element, the peripheral edge of the mirror projecting upward above the distal light element and further including
  a proximal frame wall having a top and attached to the base in fixed position relative to the peripheral edge of the mirror and proximal to the pole; and
  a proximal electric light having a proximal light element, the proximal electric light sandwiched between the peripheral edge of the mirror and the proximal frame wall, the top of the proximal frame wall projecting upward above the proximal light element.

14. The apparatus of claim 13 further including:

a third electric light attached to the pole in fixed position relative thereto.

* * * * *